Nov. 26, 1935. H. F. MILLS 2,022,296
WINDSHIELD
Original Filed June 3, 1930
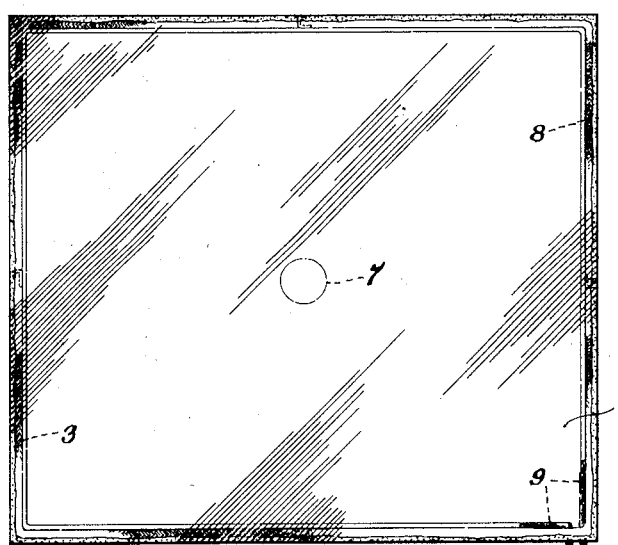
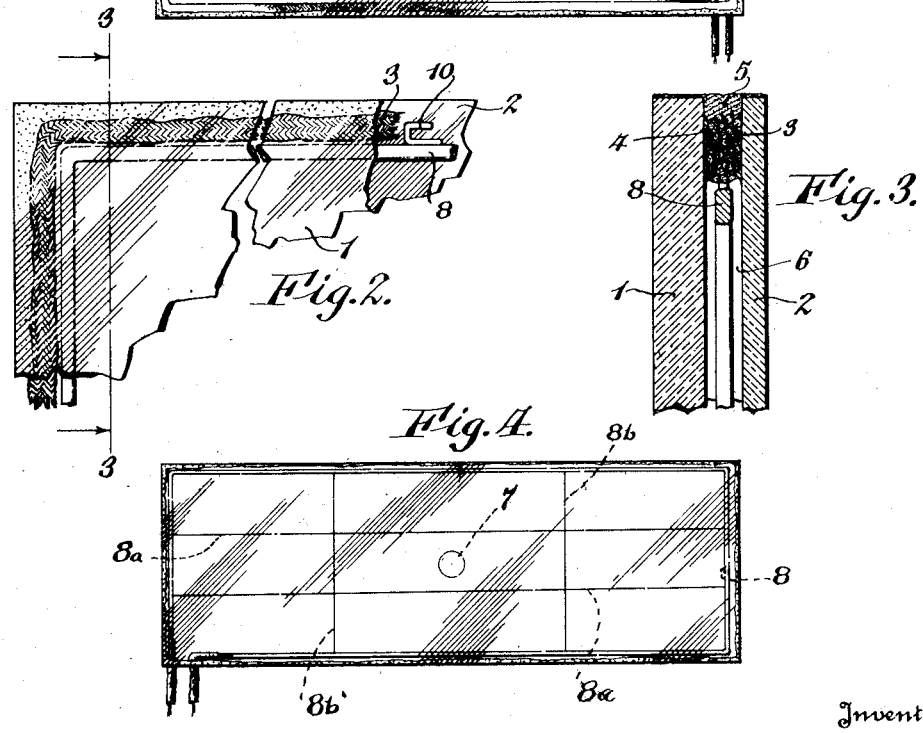
Inventor
Howard F. Mills
By Popp and Powers
Attorneys Patented Nov. 26, 1935

2,022,296

UNITED STATES PATENT OFFICE 2,022,296

WINDSHIELD

Howard F. Mills, Buffalo, N. Y., assignor of one-half to George W. Wenz, Lancaster, N. Y.

Refiled for abandoned application Serial No. 459,026, June 3, 1930. This application February 20, 1934, Serial No. 712,263

5 Claims. (Cl. 20—40.5)

This invention relates to improvements in windshields and its object is to provide a simply constructed inexpensive and practical structure wherein the windshield is heated by an element supplied with current from the battery or generator of the vehicle, thereby to avoid any accumulation of sleet or other forms of congealed moisture.

The invention contemplates a construction wherein two panes of glass are connected marginally in spaced relation by a medium which binds them together but has such flexibility and elasticity as will compensate for variations in expansion and contraction and wherein said connected panes provide an enclosed sealed air chamber equal in area to the portions of the panes which are utilized for vision but which is extremely narrow in thickness, a heating element in the form of a plain wire, preferably slightly flattened being arranged marginally in said chamber and connected to and supported by the means for connecting and spacing the panes of glass, said heating element being operative on low resistance to develop a relatively low degree of heat which will raise the temperature of the glass panes to a degree such that the accumulation of sleet, snow or condensed or congealed moisture will be effectively prevented, thereby to enable a clear view at all times through the windshield.

The invention is illustrated in the accompanying drawing in which:

Figure 1 is an elevation of a windshield applicable to automobiles.

Figure 2 is a detailed fragmentary elevation of a corner portion of the windshield with parts of one of the panes broken away.

Figure 3 is a detailed section on the line 3—3 of Figure 2.

Figure 4 is an elevation of a windshield applicable to automobiles.

The windshield illustrated in Figure 1 is nearly square, in conformity with the dimensions now standard in present types of aeroplanes. The construction includes inner and outer panes of glass 1 and 2; the inner pane may be of any suitable construction of shatter-proof glass while the outer pane 2 is of clear plate glass.

The panes 1 and 2 are connected and at the same time held in spaced relation by a medium which includes a flexible cord 3 composed of strands of asebestos or other suitable non-inflammable and non-heat conducting material and an adhesive binder 4 which solidifies at normal temperatures and with which the cord 3 is impregnated by dipping or other suitable treatment, the binder being preferably composed of waterproof glue. It will be understood, however, that other binders having requisite qualifications may, of course, be used. A layer 5 of a suitable sealing medium such as show case cement is preferably used to fill and seal the crevice between the panes 1 and 2 and beyond the cord 3. The cord 3 is arranged adjacent to the margins of the panes 1 and 2 and with said panes provides a sealed enclosed air chamber 6.

It is preferable to provide within the chamber 6 and at the center thereof a disk 7 of small area, that is to say, of a diameter of an inch or somewhat less, the disk 7 preferably being of glass and being connected by a suitable adhesive to the panes 1 and 2. This disk maintains the spacing of the panes at their centers substantially uniform with the spacing at their margins and prevents said panes by flexion from any cause from rubbing against one another and marring their finish.

The chamber 6 is heated by a resistance element 8 arranged at the margin of said chamber and closely adjacent the cord 3. The element 8 is in the form of a plain wire of suitable resistance metal and is preferably slightly flattened. At one corner of the windshield the element 8 is connected to insulated copper lead-in wires 9; these preferably extend for short distances into the chamber 6 and are connected to the resistance wire 8, within said chamber in order that said wire may not be exposed to cold temperatures at any point outside of said chamber. The wire 8 is positively supported from the cord 3 and for this purpose may have hooks 10 or other devices for engagement with said cord welded thereto at suitable intervals.

The air chamber 6 which is co-extensive in area with the panes 1 and 2 except as to those portions of said panes taken up by the cord 3 and layer 5 is of very narrow thickness, being preferably limited to a thickness of one-sixteenth of an inch. The wire 8 is preferably of substantially less thickness than the air chamber in order that it may be placed co-incidentally with a central plane of the said air chamber without touching either of the panes 1 and 2.

The wire 8 as energized from the battery or generator will heat the chamber 6 substantially uniformly throughout its area to a temperature of the order of 150 or 160° C. and thereby the panes of glass will be raised to a temperature, even under conditions of severe cold, amply high to prevent the accumulation of sleet, snow or condensed or congealed moisture.

The construction shown in Figure 4 differs from the construction shown in Figure 1 only in that resistance wires 8a, preferably horizontally arranged, which are bridged across the end runs of the resistance wire 8. The wires 8a are preferably welded to the wire 8 and are arranged at intervals of three inches more or less, being of comparatively small diameters and having a suitable finish so that they will not be conspicuous. This construction is preferred for automobiles because of the greater length of an automobile windshield as compared with an aeroplane windshield and of the lower voltage of batteries used in automobiles as compared with batteries used in aeroplanes. These considerations make it more difficult to heat the chamber 6 of an automobile windshield uniformly and the wires 8a overcome this objection.

Variations in temperature as between the panes 1 and 2 and as between either of said panes and the resistance wire, with resultant variations in expansion and contraction are taken up by the connecting medium composed of the cord 3 and the glue 4, which medium has a sufficient measure of flexibility or elasticity to serve this result. The cement 5 is used because of its relatively high flexibility and permits a more effective relative yielding of the panes under conditions of varying expansion and contraction than could be obtained if the marginal crevice were solidly filled in with glue. The amount of glue required is thus comparatively small and does not interfere with the requisite flexible qualities of the cord 3.

It will, of course, be understood that in use the marginal portions of the windshield will be covered by a suitable frame whereby the parts enclosed within the chamber 6 will be concealed. Hence the provision of these parts does not make the windshield unsightly nor substantially different in appearance from a windshield of ordinary form.

In the construction of the windshield the wire 8 is bent into the required rectangular form and the cord 3 is connected to the hooks 10 carried by said wire and, as impregnated with the adhesive medium 4, is laid upon one of the panes near the margin thereof, the insulated terminal wires 9 being passed through, i. e. between strands of the cord 3. The re-enforcing disk 7 may be attached to either pane and its exposed surface is provided with suitable adhesive. With the cord 3 positioned as described on one of the panes the other pane is then placed in the proper position upon said cord and the margins of the two panes are suitably clamped together. Some heat may be applied to the panes at first if it is desired to increase the fluidity of the adhesive 4. The clamping pressure is maintained for a suitable time, that is to say until the adhesive has set whereupon the layer of showcase cement 5 is placed in the crevice beyond the cord 3 and is preferably extended over the marginal edges of the panes.

The construction shown in Figure 4 is made in the same manner except that the wires 8a are originally connected to the wire 8. If desired thin inconspicuous vertical wires 8b of non-conducting metal may be utilized to hold the wires 8a against sagging. The wires 8b are connected to the wires 8 and 8a in any suitable manner, for example by welding and not more than two of them arranged at opposite sides of the vertical center of the windshield will be required.

This application refiled for (abandoned) application, Serial No. 459,026, filed June 3, 1930.

Having fully described my invention, I claim:

1. A windshield consisting of plates of glass in parallel planes, means arranged between said plates and including a flexible cord and an adhesive binder with which said cord is impregnated for connecting said plates along their marginal portions in determinately spaced relation, said plates and said means providing an enclosed sealed air chamber of comparatively narrow thickness, and a wire of resistance metal extending along the marginal portion of said chamber and having terminals projecting through said means to the exterior of said chamber, said wire having projections for engagement with said cord as a support, said means having a measure of flexibility to compensate for variations in expansion and contraction of the associated parts.

2. A windshield consisting of plates of glass in parallel planes, means arranged between said plates and including a flexible cord and an adhesive binder with which said cord is impregnated for connecting said plates along their marginal portions in determinately spaced relation, said plates and said means providing an enclosed sealed air chamber of comparatively narrow thickness, and a wire of resistance metal extending along the marginal portion of said chamber and having terminals projecting through said means to the exterior of said chamber, said wire having projections for engagement with said cord as a support and being held thereby out of contact with said plates, said means having a measure of flexibility to compensate for variations in expansion and contraction of the associated parts.

3. A windshield consisting of plates of glass in parallel planes, means arranged between said plates and including a flexible cord and an adhesive binder with which said cord is impregnated for connecting said plates along their marginal portions in determinately spaced relation, said plates and said means providing an enclosed sealed air chamber of comparatively narrow thickness, a wire of resistance metal extending along the marginal portion of said chamber and having terminals projecting through said means to the exterior of said chamber, said wire having projections for engagement with said cord as a support, said means having a measure of flexibility to compensate for variations in expansion and contraction of the associated parts, said means being arranged inwardly of the margins of said panes and a filling of flexible cement in the crevice between said panes beyond said means.

4. A windshield consisting of plates of glass in parallel planes, means arranged between said plates and including a flexible cord and an adhesive binder with which said cord is impregnated for connecting said plates along their marginal portions in determinately spaced relation, said plates and said means providing an enclosed sealed air chamber of comparatively narrow thickness, a wire of resistance metal extending along the marginal portion of said chamber and having terminals projecting through said means to the exterior of said chamber, said wire having projections for engagement with said cord as a support, said means having a measure of flexibility to compensate for variations in expansion and contraction of the associated parts and a transparent disk arranged at the approximate center of said chamber to maintain the spacing of the panes at such point and elsewhere uniformly with their spacing as provided by said means at their marginal portions.

5. A windshield consisting of plates of glass in parallel planes, means arranged between said plates and including a flexible cord and an adhesive binder with which said cord is impregnated for connecting said plates along their marginal portions in determinately spaced relation, said plates and said means providing a sealed air chamber of comparatively narrow thickness and a wire of resistance metal arranged between said plates, said wire having projections for engagement with said cord as a support, said means having a measure of flexibility to compensate for variations in expansion and contraction of the associated parts.

HOWARD F. MILLS.